United States Patent
Woods

(10) Patent No.: US 9,304,996 B2
(45) Date of Patent: *Apr. 5, 2016

(54) DYNAMIC DATA ACCESS AND STORAGE

(71) Applicant: Ariba, Inc., Sunnyvale, CA (US)

(72) Inventor: David R. Woods, Marietta, GA (US)

(73) Assignee: ARIBA, INC., Sunnyvale, CA (US)

(*) Notice: Subject to any disclaimer, the term of this patent is extended or adjusted under 35 U.S.C. 154(b) by 145 days.

This patent is subject to a terminal disclaimer.

(21) Appl. No.: 13/853,684

(22) Filed: Mar. 29, 2013

(65) Prior Publication Data

US 2014/0040190 A1    Feb. 6, 2014

Related U.S. Application Data

(63) Continuation of application No. 11/980,995, filed on Oct. 30, 2007, now Pat. No. 8,433,730.

(60) Provisional application No. 60/855,651, filed on Oct. 31, 2006.

(51) Int. Cl.
*G06F 12/08* (2006.01)
*G06F 17/30* (2006.01)

(52) U.S. Cl.
CPC ...... *G06F 17/3007* (2013.01); *G06F 17/30575* (2013.01)

(58) Field of Classification Search
CPC .................. G06F 17/3007; G06F 17/30575
See application file for complete search history.

(56) References Cited

U.S. PATENT DOCUMENTS

| | | | |
|---|---|---|---|
| 5,046,002 A | 9/1991 | Takashi et al. | |
| 5,261,080 A | 11/1993 | Khoyi et al. | |
| 5,590,319 A | 12/1996 | Cohen et al. | |
| 5,761,696 A | 6/1998 | Giordano et al. | |
| 6,018,743 A | 1/2000 | Xu | |
| 6,185,619 B1 | 2/2001 | Matsunami et al. | |
| 6,343,287 B1* | 1/2002 | Kumar et al. | |
| 6,480,953 B1* | 11/2002 | Hughes ........................ 713/1 |
| 6,643,635 B2 | 11/2003 | Nwabueze | |
| 6,732,100 B1 | 5/2004 | Brodersen et al. | |
| 6,748,447 B1 | 6/2004 | Basani et al. | |
| 6,775,675 B1 | 8/2004 | Nwabueze et al. | |

(Continued)

OTHER PUBLICATIONS

Doug Kerwin, "Achieving Massive Scalability with SQL Server," available at SQL-Server-Performance.com (May 10, 2003).

(Continued)

*Primary Examiner* — Tarek Chbouki
(74) *Attorney, Agent, or Firm* — Fountainhead Law Group PC

(57) ABSTRACT

A master dynamic configuration directory can store connection strings and data adapters for data entities based on a routing identifier and a business entity identifier. The information can be stored in multiple data stores, each of which can have a different data type. A data request from a requesting entity comprises a routing identifier and a business entity identifier. A system application can receive a data request and can access the local instance of the dynamic configuration directory to determine the corresponding connection string and data adapter based on the routing identifier and business entity identifier in the data request. The system sub-application creates a data access instance based on the connection string and data adapter. The system application loads the data access instance to access the data entity at the appropriate location and to perform a data function according to the data request.

20 Claims, 5 Drawing Sheets

(56) References Cited

U.S. PATENT DOCUMENTS

| | | | |
|---|---|---|---|
| 7,016,950 B2 | 3/2006 | Tabbara et al. | |
| 7,043,545 B2 | 5/2006 | Tabbara et al. | |
| 7,127,480 B2 | 10/2006 | Kline et al. | |
| 7,464,222 B2 | 12/2008 | Matsunami et al. | |
| 7,599,959 B2 | 10/2009 | Friedrich et al. | |
| 8,433,730 B2 | 4/2013 | Woods | |
| 2003/0074139 A1* | 4/2003 | Poedjono | 702/16 |
| 2003/0163509 A1* | 8/2003 | McKean et al. | 709/100 |
| 2004/0172459 A1* | 9/2004 | Schwalm et al. | 709/217 |
| 2005/0125464 A1 | 6/2005 | Kline | |
| 2005/0237947 A1* | 10/2005 | Ando et al. | 370/254 |
| 2005/0256937 A1 | 11/2005 | Lewis | |
| 2006/0177024 A1* | 8/2006 | Frifeldt et al. | 379/88.22 |
| 2006/0218203 A1 | 9/2006 | Yamato et al. | |
| 2006/0265431 A1 | 11/2006 | Yamato et al. | |
| 2007/0005707 A1 | 1/2007 | Teodosiu et al. | |
| 2007/0047279 A1* | 3/2007 | Evans et al. | 365/1 |
| 2007/0106712 A1 | 5/2007 | Yamato et al. | |
| 2009/0070444 A1 | 3/2009 | Fujino et al. | |
| 2010/0023412 A1 | 1/2010 | Kitagawa et al. | |

OTHER PUBLICATIONS

Frederick Chong, Gianpaolo Carraro, and Roger Wolter, Microsoft Corporation, "Multi-Tenant Data Architecture" (Jun. 2006).

* cited by examiner

DYNAMIC DATA ACCESS AND STORAGE

RELATED PATENT APPLICATION

This patent application claims priority under 35 U.S.C. §119 to U.S. Provisional Patent Application No. 60/855,651, entitled "Data Containment Architectural Framework" and filed Oct. 31, 2006, the complete disclosure of which is hereby fully incorporated herein by reference.

FIELD OF THE INVENTION

The invention relates generally to data access and storage methodologies. Specifically, the invention relates to data access and storage methodologies using a dynamic configuration directory to access data in multiple data stores using a scalable architecture.

BACKGROUND OF THE INVENTION

Multi-faceted software applications generally offer a large number of users a variety of functionality and access to a large amount of data. Such applications typically service the clients using a single instance of the application and data. This structure is known as a "multi-tenancy" model, because a single instance of the application has multiple "tenants," or clients. When a client accesses the application to retrieve, update, delete, or perform some other function to the data, this action is known as a "data request."

A typical multi-tenant application consists of a three-tier architecture. The tiers include the presentation tier, the business processing tier, and the data management tier. As the functionality, data, and number of clients using the software application grow, the complexity of the tiers grows increasingly complex and unmanageable. The data management tier often becomes the most unmanageable as the system grows in clients, functionality, and number of data requests. Providing for the increase involves obtaining larger servers to house the data. Because multi-tenant applications only have a single instance of the data, this method is currently the only way to scale such an application. Increasing server size generally is inefficient and costly. Thus, conventional systems have drawbacks in terms of scalability. Scalability is desirable because it allows for an appropriate, balanced architecture to optimize storage and usage.

Conventional multi-tenancy systems also obtain data from a static data store. Typically, the location of the data is "hard-coded" into application configuration files, such that the data location is in a configuration support file that the program code reads. The location of the data can also be hard-coded into the application. Hard-coding can involve embedding the data location directly into the program code. Under these conventional methods, data relocation among different storage devices can require a system programmer to re-code to satisfy a data request. This conventional static method of locating data is inconvenient and inflexible. Although conventional methods exist for accessing data among multiple sources, those methods are not dynamic and are still "hard-coded" into the application. Thus, conventional methods are inefficient at storing and accessing data among multiple data stores.

Conventional methods also involve storing data according to the particular requesting entity, such as a client, in the same location. For example, all data for a particular client is stored on the same server. The result is that a particular client cannot access data from multiple sources.

Accordingly, a need exists in the art for a scalable, configurable, data access methodology. In particular, a need exists in the art for a system and method for dynamically accessing and storing data in multiple locations based on business logic. Further, a need exists in the art for scalable architecture in the multi-tenant environment.

SUMMARY OF THE INVENTION

The invention provides systems and methods for dynamic data access using scalable architecture. Specifically, the invention provides for systems and methods for creating and accessing a dynamic configuration directory to accurately and efficiently satisfy data requests based on a business entity identifier and routing identifier. Using a dynamic configuration directory allows a system application to provide transparency across multiple data stores and allows seamless data relocation. The invention also allows for grouping of data based on business logic, because the data requests are satisfied based not only on a routing identifier, but on the particular functional component of the application that being accessed.

The dynamic configuration directory comprises connection strings and data adapters for data entities that can be accessed through data requests. The connection string indicates the location of the data entity, and the data adapter indicates the data type. The connection string is a piece of computer code that, when executed, locates or identifies a particular data entity in the appropriate data storage device within data stores. The data adapter associated with a data entity is a piece of computer code that, when executed, indicates the data type, the functionality for accessing the particular data type, and the corresponding data functionality that a requesting entity can perform. In certain alternative aspects, multiple types of data can be stored at multiple locations. For example, data can be stored on a web service at one location, a database server at another location, and a flat file at yet another location. The connection string and data adapter provide the requisite code for the system application to access the requested data entity. A system programmer can categorize the connection strings and data adapters in the dynamic configuration directory according to an associated routing identifier and business entity identifier. As data entities are relocated or undergo other changes, the system programmer can continually update the dynamic configuration directory. Thus, the invention can allow for relocation of data entities based on business logic, load balancing needs, or some other relevant need without the need to rewrite portions of the system application code.

A data request is a request submitted by a requesting entity to the system application. In certain alternative aspects, the requesting entity can include a user of a client. Each data request can include at least two attributes, such as a business entity identifier and a routing identifier. The business entity identifier indicates the particular functional component of the system application that the data request is attempting to access. In certain exemplary aspects, the business entity can include the functional components of "Survey," "User," or "Request for Proposal" ("RFx"). The routing identifier indicates the particular instance of the business entity that the requesting entity is attempting to locate.

A data container module within the system application can receive a data request and access the dynamic configuration directory. The data container module can determine the appropriate connection string and data adapter based on the routing identifier and business entity identifier of the data request. The data container module can send this information to a data access instance module. The connection string indicates the location where the requested data is stored. The data adapter provides the information for accessing the data type stored at that particular location.

The data access instance module can create a data access instance based on the connection string and data adapter. The data access instance can load the data access instance into the system application, which can effectively access the data in the appropriate location and perform the requested function according to the data request.

Thus, requesting entities can access data in multiple locations based not only on their routing identifier, but also on a business entity identifier. In certain alternative aspects, data can be accessed on a per-client and a per-functional component basis. Further, the system programmer can separate data for a single requesting entity based on business logic and store it in multiple locations. This provides the system programmer with the ability to scale the architecture, by controlling where to store data. In addition, the system programmer is not required to re-code the system application to make such changes. The result is a more efficient system of data access with scalable architecture.

These and other aspects, objects, features, and advantages of the invention will become apparent to a person having ordinary skill in the art upon consideration of the following detailed description of exemplary embodiments.

DETAILED DESCRIPTION OF EXEMPLARY EMBODIMENTS

The invention is directed to dynamic and configurable data access and storage using scalable architecture. A dynamic configuration directory allows for efficient data access based on a routing identifier and a business entity identifier from a data request. The dynamic configuration directory provides a connection string and data adapter that is used to locate the requested data among one or more types of data storage devices at one or more locations. The dynamic configuration directory also allows for manipulation of the data as requested. Using the dynamic configuration directory allows for configurable and scalable data storage without hard coding the application. Thus, a system programmer can seamlessly move data among various data stores while providing efficient and accurate data access to requesting entities.

The invention includes a computer program that embodies the functions described herein and illustrated in the appended flow charts. However, it should be apparent that there could be many different ways of implementing the invention in computer programming, and the invention should not be construed as limited to any one set of computer program instructions. While the invention is described herein in terms of object-oriented programming, it is not considered the only mode. Object-oriented programming uses "objects" that have distinct roles and capabilities that work together to create a software application. Further, a programmer having ordinary skill in the art would be able to write such a computer program to implement an embodiment of the disclosed invention based on the flow charts and associated description in the application text. Therefore, disclosure of a particular set of program code instructions is not necessary for an adequate understanding of how to make and use the invention. The inventive functionality of the claimed computer program will be explained in more detail in the following description read in conjunction with the figures illustrating the program flow.

Turning now to the drawings, in which like numerals indicate like elements throughout the figures, exemplary embodiments of the invention are described in detail.

Figure 1:
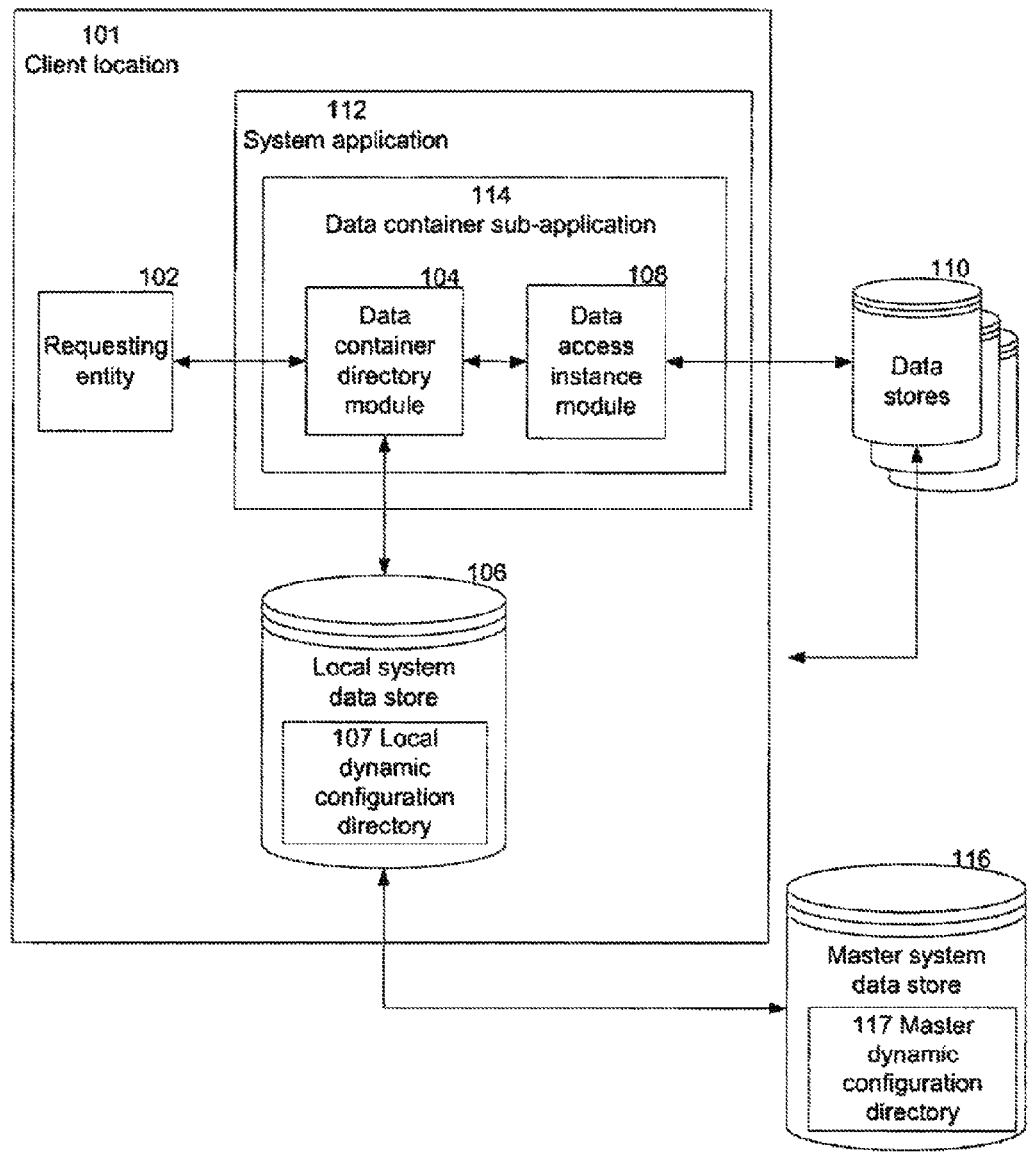
FIG. 1 is a block diagram depicting a system for dynamic data access and storage, in accordance with certain exemplary embodiments of the invention.

FIG. 1 is a block diagram depicting a system 100 for dynamic data access and storage, in accordance with certain exemplary embodiments of the invention. The system 100 is described hereinafter with reference to the methods illustrated in FIGS. 2-4.

Figure 2:
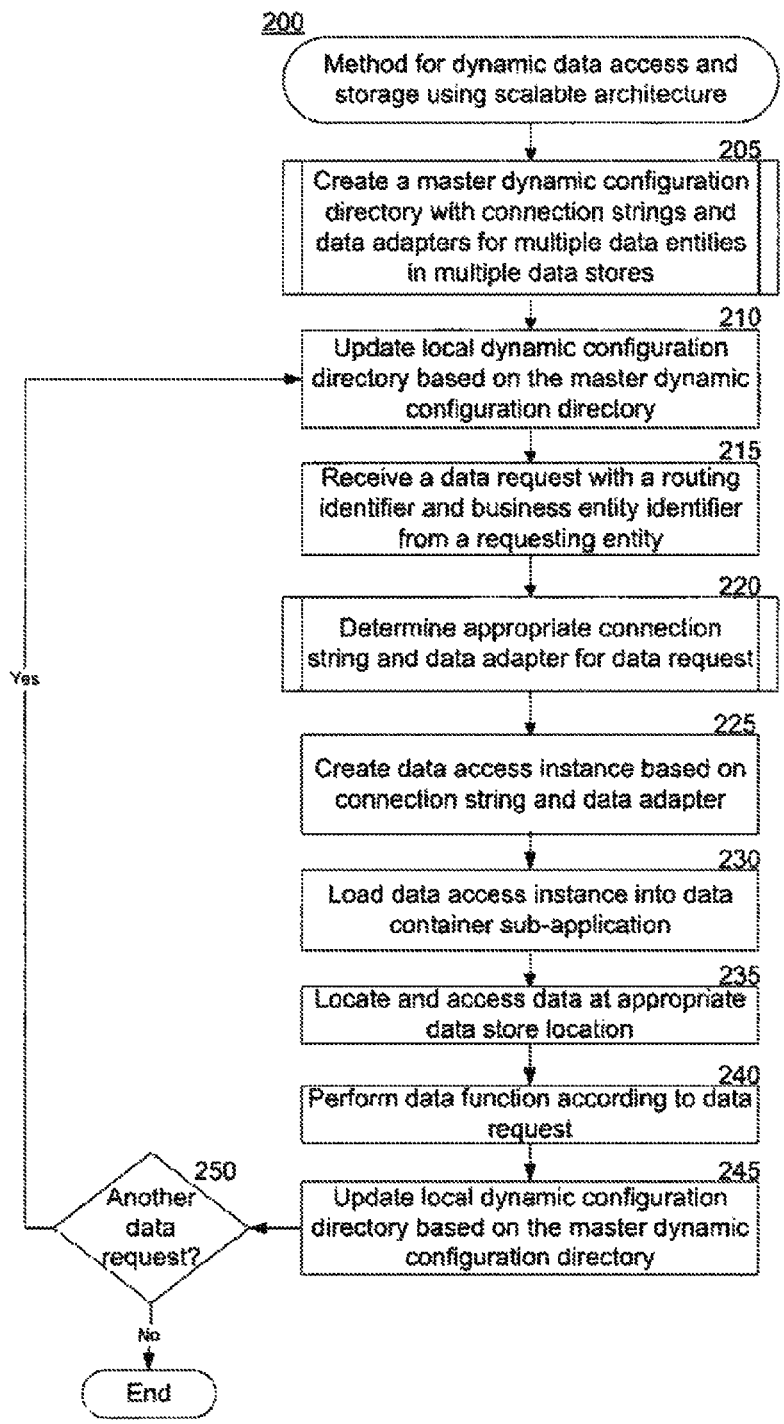
FIG. 2 is a flow chart depicting a method for dynamic data access and storage, according to certain exemplary embodiments of the invention.

FIG. 2 is a flow chart depicting a method 200 for dynamic data access and storage, according to certain exemplary embodiments of the invention. The exemplary method 200 is illustrative and, in alternative embodiments of the invention, certain steps can be performed in a different order, in parallel with one another, or omitted entirely, and/or certain additional steps can be performed without departing from the scope and spirit of the invention. The method 200 is described hereinafter with reference to FIGS. 1 and 2.

In step 205, a system programmer creates a dynamic configuration directory 117 with connection strings and data adapters for multiple data entities stored in multiple data stores 110. A data entity is a particular piece of data, or, in object-oriented programming, it is an "object." In certain alternative embodiments a data entity can include a client and/or an address. Data entities can be stored in various types of data stores. Each of those data stores can have its own unique mechanism for accessing the data. For example, the data stores storing the data entities can comprise a web service, a database server, a flat file, an excel spreadsheet, and any other suitable data store. For each data entity, a system programmer assigns a connection string and a data adapter indicating the location of the data entity in the data stores 110 and the data entities data type, respectively. The connection string is a piece of computer code that, when executed, locates or identifies a particular data entity in the appropriate data storage device within the data stores 110. The data adapter associated with a data entity is a piece of computer code that, when executed, indicates the data type, the functionality for accessing the particular data type, and the corresponding data functionality that a requesting entity 102 can perform. In certain alternative embodiments, data functionality can include retrieving, adding, updating, and/or deleting data.

The system programmer categorizes the connection strings and data adapters in the master dynamic configuration directory 117 according to a routing identifier and a business entity identifier. The routing identifier is an identifier associated with a requesting entity 102, indicating the particular requesting entity that could request the data. The business entity identifier is similarly associated with a data request and indicates the particular functional component of the application that the data request could attempt to access. In certain alternative embodiments, a business entity can include the functional components of the application including "Survey," "User," and "Request for Proposal" ("RFx"). Thus, the master dynamic configuration directory 117 contains connection strings and data adapters categorized according to the corresponding routing identifier and business entity identifier. A master system data store 116 stores the master dynamic configuration directory 117. Creation and storage of the master dynamic configuration directory 117 is discussed in more detail hereinafter with reference to FIG. 3.

In step 210, the master dynamic configuration directory 117 created in step 205 and stored in the master system data store 116 updates a local dynamic configuration directory 107 stored in a local system data store 106 at a client location 101. The local system data store 106 stores a separate instance of the master dynamic configuration directory 117 as the local dynamic configuration directory 107. The local system data store 106 is a database that resides at the client location 101 and is associated with a system application 112. Step 210 can be repeated periodically or after an update of the master dynamic configuration directory 117 to provide for continuous updates of the local system data store 106, such that the local dynamic configuration directory 107 in the local system data store 106 is the same as the master dynamic configuration directory 117 in the master system data store 116. In alternative exemplary embodiments, the update in step 210 can be requested by the system application 112 or can be pushed from the master system data store 116.

In step 215, a container directory module 104 of a system application 112 receives a data request from a requesting entity 102. In certain alternative embodiments, the requesting entity 102 can comprise one or more companies that use the system application 112 for one or more purposes, even though only one client location 101 and requesting entity 102 are illustrated in FIG. 2 for simplicity. Exemplary purposes comprise a client using the system application, 112 to obtain information regarding business survey results or a user inputting business survey responses. Further, in certain embodiments, the invention can comprise one or more system application 112. For example, each requesting entity 102 can have an instance of the system application 112. More detail on the system application 112 is discussed below with reference to FIG. 5.

Each data request includes an associated routing identifier and business entity identifier. The routing identifier is an identifier associated with a particular instance of the business entity that the requesting entity 102 is attempting to access. The business entity identifier is similarly associated with a data request and indicates the particular functional component of the system application 112 that the requesting entity 102 is attempting to access. In certain alternative embodiments, a business entity can include the functional components of the application including "Survey," "User," or "Request for Proposal ("RFx")."

In step 220, the container directory module 104 determines the connection string and data adapter associated with the routing identifier and business entity identifier received in step 215. The container directory module 104 accesses the local dynamic configuration directory 107 in the local system data store 106 to retrieve the corresponding connection string and data adapter. Thus, for each data request, the container directory module 104 accesses the local dynamic configuration directory 107 at the instant the data is requested, providing real time accuracy as to the location and type of the data. Step 220 is discussed in more detail hereinafter with reference to FIG. 4.

In step 225, the data access instance module 108 creates a data access instance based on the connection string and data adapter located by the container directory module 104 in step 220. A data access instance provides the requisite piece of computer code to access the data entity in the appropriate location and to allow for the appropriate data functionality according to the data adapter.

In step 230, the data access instance module 108 loads the data access instance to a data container sub-application 114, which executes the data access instance to locate the appropriate data store 110 based on the connection string (step 235), to access the appropriate data store 110 using the data adaptor corresponding to the data type of the appropriate data store 110 (step 235), and to execute the data functionality of the business entity (step 240). In certain alternative embodiments, data functionality can include retrieving, editing, deleting, and/or updating data.

From step 240, the method 200 proceeds to step 245 in which the local dynamic configuration directory 107 is updated based on the master dynamic configuration directory 117. Step 245 can be performed in a manner similar to the process described previously with reference to step 210.

Step 250 is a decision block in which the system application 112 determines whether there is another data request to process. If there is another data request, the method 200 branches to step 210, and the method proceeds as described previously. If another data request does not exist, then the method 200 ends.

Figure 3:
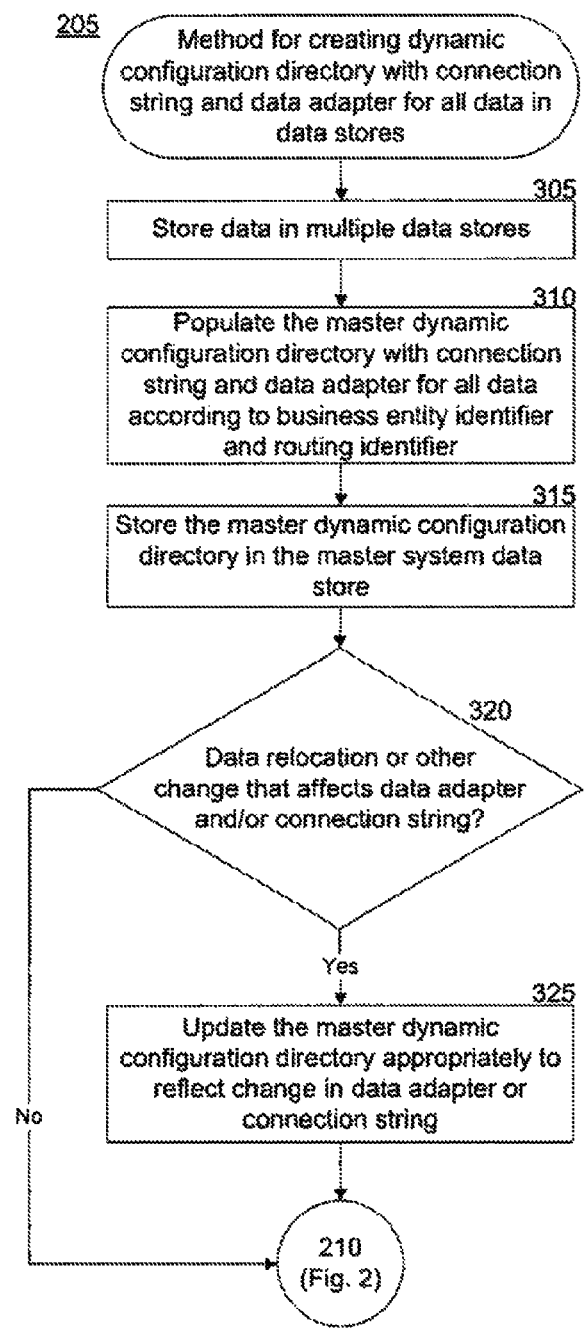
FIG. 3 is a flow chart depicting a method for creating a master dynamic configuration directory with connection strings and data adapters for data in multiple data stores, according to certain exemplary embodiments of the invention.

FIG. 3 is a flow chart depicting a method 205 for creating the master dynamic configuration directory 117 with connection strings and data adapters for data in multiple data stores, according to certain exemplary embodiments of the invention, as described with reference to step 205 of FIG. 2. The exemplary method 205 is illustrative and, in alternative embodiments of the invention, certain steps can be performed in a different order, in parallel with one another, or omitted entirely, and/or certain additional steps can be performed without departing from the scope and spirit of the invention. The method 205 is described below with reference to FIGS. 1 and 3.

In step 305, a system programmer stores data entities of one or more types in one or more data stores 110. Data stores 110 can include one or more types of data storage devices. For example, in certain alternative embodiments, data stores 110 can include a web service, a database server, a file system, a flat file, an excel spreadsheet. and/or any other suitable data storage type. Further, data stores can include data stored at an outside entity, including behind a client's firewall. Once stored, a system programmer assigns each data entity an associated data adapter and connection string, indicating the data entity's type, functionality, and location. The data adapter indicates the type of data entity, the functional code to access the particular type of data entity, and the allowable functionality available to a particular requesting entity 102. The connection string indicates the location of the data entity among the various data stores 110. The data adapter and connection string have been described in detail herein with reference to FIG. 2.

In step 310, a system programmer populates the master dynamic configuration directory 117 with the connection string and data adapter for each data entity, according to a corresponding business entity identifier and routing identifier. The business entity identifier and routing identifier indicate a functional component of the system application 112, and a particular instance of the business entity, respectively. Both the business entity and the requesting entity have been described in more detail herein with reference to FIG. 2. Thus, the configuration directory stores the connection strings and data adapters required to retrieve data according to a particular data request. The configuration directory does not store the actual data entities, but rather it stores the information (data adapter and connection string) required to access the data entities in a dynamic and configurable directory according to a routing identifier and a business entity identifier. In certain alternative embodiments, categorization of the connection strings and data adapters can be based on other characteristics of the data request in addition to, or in place of, the routing identifier and business entity identifier. In an exemplary embodiment, the master dynamic configuration directory 117 can comprise a table.

In step 315, a system programmer stores the master dynamic configuration directory 117 in the master system data store 116. The master system data store 116 is disposed separately from the system application 112. In certain alternative embodiments, the master dynamic configuration directory 117 may be stored within one of the data stores 110 or at another location.

In step 320, a system programmer determines whether a change in a data entity has occurred that affects the configuration directory. For example, relocation of a data entity from a first one of the data stores 110 to a second one of the data stores 110 and/or relocation of a data entity for a first type of data store 110 to a second type of data store 110 would constitute such a change. In certain alternative embodiments, other changes may affect the dynamic configuration directory, including changes in the data adapter, the routing identifier, or business entity identifier. Thus, data entities can be relocated among various data stores 110 and can still be accessible to requesting entities 102 upon updates to the master dynamic configuration directory 117. Accordingly data relocation or other changes do not require a system programmer to re-code the system application 112. To the contrary, the system programmer only has to update the information in the master dynamic configuration directory 117.

If such a change is detected in step 320, the system programmer updates the dynamic configuration directory 117 in step 325 to reflect the change data entity. The method 205 then proceeds to step 210 of FIG. 2. If changes that require updates to the configuration directory are not detected in step 320, then the method 205 can branch directly to step 210 in FIG. 2.

Figure 4:
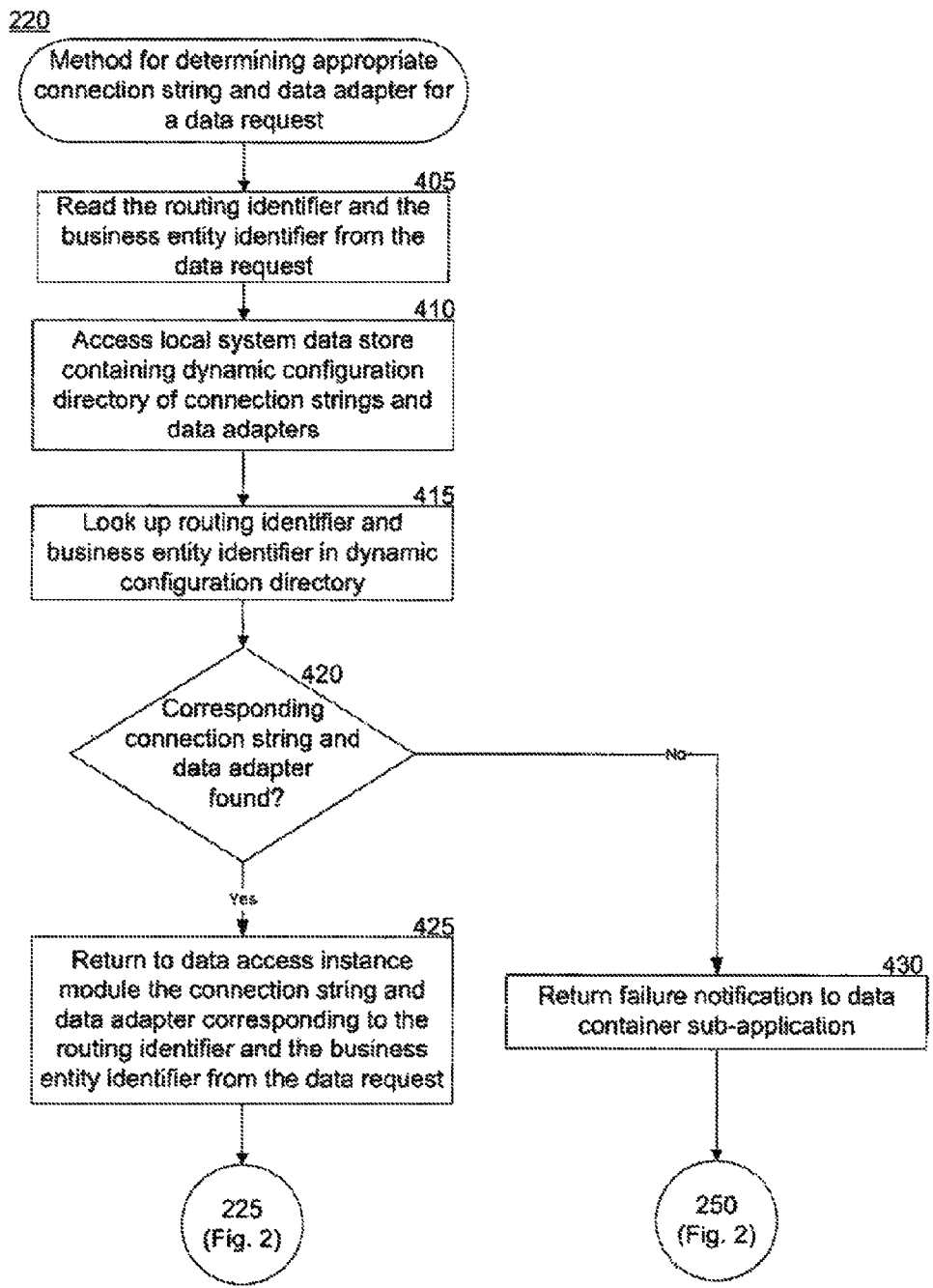
FIG. 4 is a flow chart depicting a method for determining the appropriate connection string and data adapter for a data request, in accordance with certain exemplary embodiments of the invention.

FIG. 4 is a flow chart depicting a method 220 for determining the appropriate connection string and data adapter for a data request, in accordance with certain exemplary embodiments of the invention, as referenced in step 220 of FIG. 2. The exemplary method 220 is illustrative and, in alternative embodiments of the invention, certain steps can be performed in a different order, in parallel with one another, or omitted entirely, and/or certain additional steps can be performed without departing from the scope and spirit of the invention. The method 200 is described below with reference to FIGS. 1 and 4.

In step 405, the data container directory module 104 reads a routing identifier and business entity identifier from the data request.

In step 410, the data container directory module 104 accesses the local system data store 106, containing the local dynamic configuration directory 107 of connection strings and data adapters for multiple data entities.

In step 415, the data container directory module 104 looks up the routing identifier and business entity identifier associated with the data request in the local dynamic configuration directory 107, based on the routing identifier and business entity identifier from the data request.

In step 420, the data container directory module 104 determines whether a corresponding connection string and data adapter are found in the local dynamic configuration directory 107. If the data container directory module 104 locates a corresponding connection string and data adapter, the method 220 branches to step 425. In step 425, the data container directory module 104 sends the connection string and data adaptor to the data access instance module 108. The method 220 then proceeds to step 225 of FIG. 2.

If, in step 420, the data container directory module 104 does not locate a corresponding connection string and data adapter in the local dynamic configuration directory 107, the method 220 branches to step 430. In step 430, the data container directory module 104 returns a failure notification to the data container sub-application 114. The failure notification indicates that the requested data entity can not be currently accessed. At this point, the method 220 proceeds to step 250 of FIG. 2.

Figure 5:
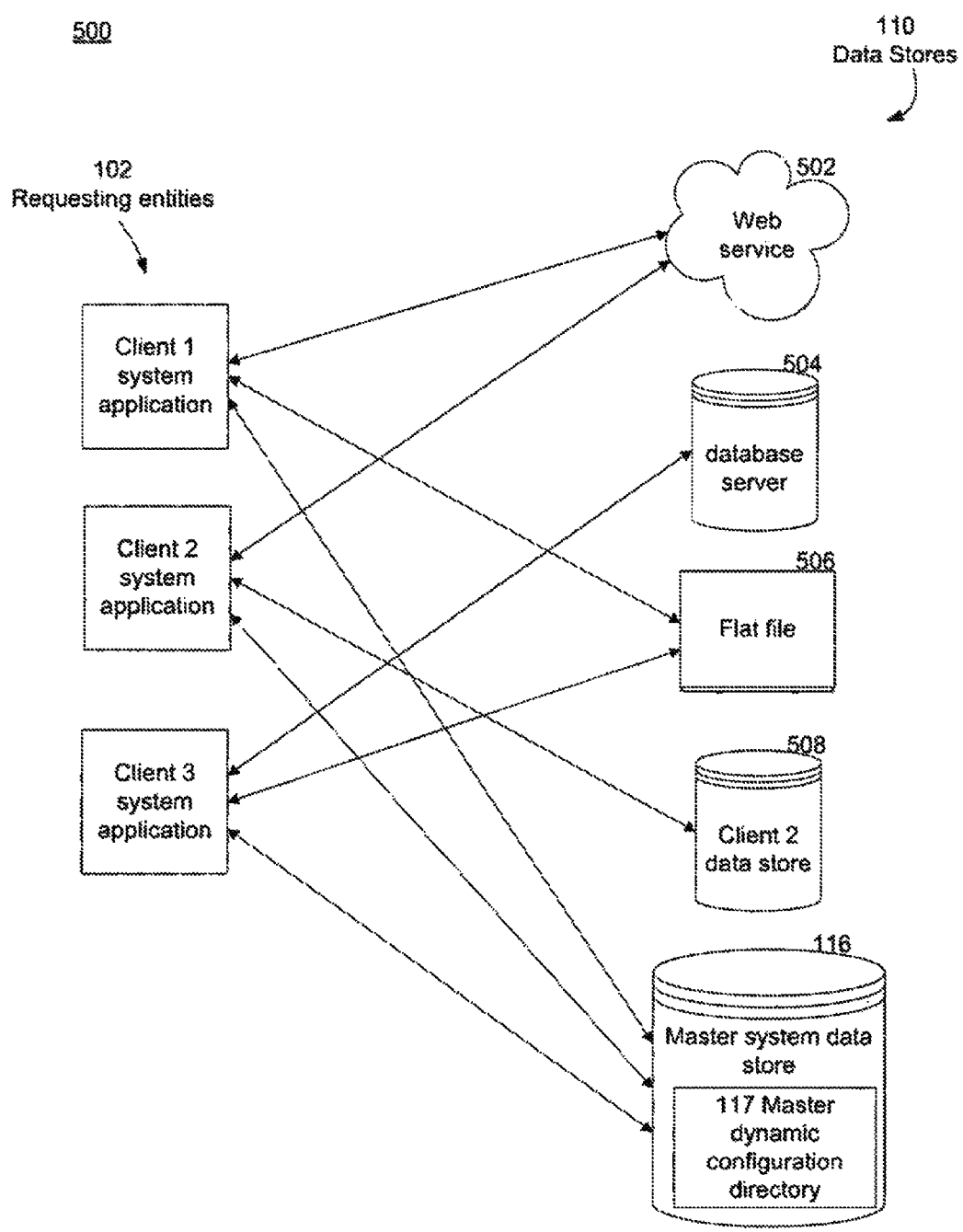
FIG. 5 is a block diagram depicting a system for dynamic data access and storage and illustrating the access of multiple data stores by each requesting entity, in accordance with certain alternative exemplary embodiments of the invention.

FIG. 5 is a block diagram depicting a system 500 for dynamic data access and storage and illustrating the access of multiple data stores 110 by multiple requesting entities 102, in accordance with certain alternative exemplary embodiments of the invention. The exemplary system 500 is illustrative and, in alternative embodiments of the invention, certain elements can be arranged differently, additional elements can be added, and/or certain elements can be omitted entirely, without departing from the scope and spirit of the invention.

Requesting entities 102 include one or more entities, such as companies. In certain alternative embodiments, each requesting entity 102 can have a separate instance of the system application 112, or the requesting entities 102 can access a single instance of the system application 112 (not shown).

Data stores 110 include one or more types of data storage devices. For example, data stores 110 can include one or more of the following types of data storage devices: a web service 502, a database server 504, a flat file 506; and/or a client-specific data store as depicted by client 2 data store 508. In certain alternative embodiments (not shown), the data stores 110 can include other types of suitable data storage not listed here, including, at least, an excel file, a file system, and/or a database stored at an outside entity, including behind a client's firewall.

Data entities are distributed among the various data stores 110. In certain alternative embodiments, data entities pertaining to a single requesting entity 102 can be stored in multiple data stores 110, for example, on a web service 502 and in a flat file 506. The distribution of data entities among the data stores 110 can be based on a system programmer's load balancing or other architectural or business needs. For example, in certain alternative embodiments, a system programmer can move data entities from a database server 504 to a web service 502 to optimize data storage and accessibility. Further, a system programmer can store data entities based on business entity identifier or another logical business model. For example, a system programmer can group data in the data stores 110 according to the information category, including buyer information, supplier information, and/or authentication information. Thus, the architecture is scalable because a system programmer can seamlessly move data entities among the data stores 110.

The master system data store 116 contains the master dynamic configuration table 117 as previously described herein with reference to FIGS. 1-3. Each of the requesting entities 102 includes an instance of the local dynamic configuration table 107 as previously described herein with reference to FIGS. 1-3.

The lines connecting the requesting entities 102 and the master system data store 116 represent the continual update of the local dynamic configuration table 107 (FIG. 1) in the local system data store 106 (FIG. 1) by the master system data store 116. The lines connecting the requesting entities 102 to the other data stores 110 represent individual data requests, as described in detail herein with reference to FIGS. 1-4. As discussed, the data container sub-application 114 processes each data request on a per-requesting entity and per-business entity basis. Thus, for example, a data request from the Client 1 system application 112 can retrieve data stored on a web service 502, based on the routing identifier and business entity identifier associated with Client 1's request. Further, based on the request, the Client 1 system application can perform the desired functionality, including retrieving, adding, editing, and/or deleting a data entity stored in web service 502. Similarly, the Client 1 system application can retrieve data stored in a flat file 506 in a separate data request. Thus, each requesting entity 102 can dynamically retrieve data stored in various data stores 110 to perform a desired function. Because the local dynamic configuration table 107 stored in the local system data store 106 is continuously updated, each data request is satisfied accurately and efficiently without requiring a system programmer to hard-code the system application 112.

The invention can be used with computer hardware and software that performs the methods and processing functions described above. As will be appreciated by a person having ordinary skill in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Although specific embodiments of the invention have been described above in detail, the description is merely for purposes of illustration. It should be appreciated, therefore, that many aspects of the invention were described above by way of example only and are not intended as required or essential elements of the invention unless explicitly stated otherwise. Various modifications of, and equivalent steps corresponding to, the disclosed aspects of the exemplary embodiments, in addition to those described above, can be made by a person having ordinary skill in the art without departing from the spirit and scope of the invention defined in the following claims, the scope of which is to be accorded the broadest interpretation so as to encompass such modifications and equivalent structures.

What is claimed is:

1. A system comprising:
   a set of one or more processors configured to, using a set of one or more interfaces:
   store a data entity in a first data storage, wherein the data entity is stored in the first data storage using a first data storage type;
   store, in a directory, information associated with the data entity, wherein the information associated with the data entity includes:
   (1) a connection string that, when executed, identifies a location of the first data storage that the data entity is stored in, and
   (2) a data adapter that, when executed, indicates functionality for accessing the first data type used to store the data entity;
   replicate the directory to a replicated directory for access by a set of client applications;
   receive an indication of a modification to the data entity;
   in the event that the modification to the data entity includes a relocation of the data entity from the first data storage to a second data storage, cause the connection string stored in the directory to be updated such that the updated connection string, when executed, identifies the location of the second data storage to which the data entity has been relocated and cause the replicated directory to be updated with the updated connection string; and
   in the event that the modification to the data entity includes a change in the storage of the data entity from the first data type to a second data type that is different from the first data type, cause the data adapter stored in the directory to be updated such that the updated data adapter, when executed, indicates functionality for accessing the second data type and cause the replicated directory to be updated with the updated data adapter; and
   a memory coupled with the set of one or more processors and configured to provide the set of one or more processors with instructions.

2. The system of claim 1, wherein the replicated directory comprises a configuration directory local to the set of client applications.

3. The system of claim 1, wherein the set of one or more processors is further configured to receive a request from a client application in the set of client applications to provide the replicated directory with an update of the directory.

4. The system of claim 1, wherein the set of one or more processors is further configured to update the replicated directory in response to a data request processed by a client application in the set of client applications.

5. The system of claim 1, wherein the set of one or more processors is further configured to update the replicated directory periodically.

6. The system of claim 1, wherein the set of one or more processors is further configured to associate at least one of a business entity identifier and a routing identifier with the data entity.

7. The system of claim 6, wherein the connection string and the data adapter are categorized according to the at least one of the business entity identifier and the routing identifier.

8. The system of claim 6, wherein the business entity identifier indicates a particular component of an application, and wherein the routing identifier indicates a particular instance of a business entity.

9. The system of claim 1, wherein the set of applications is further configured to:
   receive a data request including one or more identifiers;
   determine, at least in part by accessing the directory, that a second connection string and a second data adapter associated with a second data entity correspond to the received one or more identifiers included in the request;
   retrieve the second connection string and the second data adapter from the replicated directory.

10. The system of claim 9, wherein the one or more identifiers include at least one of a business entity identifier and a routing identifier.

11. The system of claim 9, wherein the set of applications is further configured to provide the retrieved connection string and data adapter to a data access instance module.

12. The system of claim 11, wherein the data access module is configured to create a data access instance based at least in part on the provided connection string and data adapter.

13. The system of claim 12, wherein the data access instance, when executed, accesses the second data entity based at least in part on the provided connection string and data adaptor.

14. The system of claim 13, wherein the data access instance, when executed, performs a data function in accordance with the data request.

15. The system of claim 14, wherein the data function comprises at least one of retrieving, adding, editing, deleting, and updating the second data entity.

16. The system of claim 9, wherein the set of applications is further configured to identify a location of the second data entity to satisfy the data request.

17. The system of claim 16, wherein the location is identified based at least in part on the retrieved connection string.

18. A method comprising:
  storing a data entity in a first data storage, wherein the data entity is stored in the first data storage using a first data storage type;
  storing, in a directory, and using a set of one or more processors, information associated with the data entity, wherein the information associated with the data entity includes:
    (1) a connection string that, when executed, identifies a location of the first data storage that the data entity is stored in, and
    (2) a data adapter that, when executed, indicates functionality for accessing the first data type used to store the data entity;
  replicating the directory to a replicated directory for access by a set of client applications;
  receiving an indication of a modification to the data entity;
  in the event that the modification to the data entity includes a relocation of the data entity from the first data storage to a second data storage, causing the connection string stored in the directory to be updated such that the updated connection string, when executed, identifies the location of the second data storage to which the data entity has been relocated and causing the replicated directory to be updated with the updated connection string; and
  in the event that the modification to the data entity includes a change in the storage of the data entity from the first data type to a second data type that is different from the first data type, causing the data adapter stored in the directory to be updated such that the updated data adapter, when executed, indicates functionality for accessing the second data type and causing the replicated directory to be updated with the updated data adapter.

19. A computer program product, the computer program product being embodied in a non-transitory computer readable storage medium and comprising computer instructions for:
  storing a data entity in a first data storage, wherein the data entity is stored in the first data storage using a first data storage type;
  storing, in a directory, information associated with the data entity, wherein the information associated with the data entity includes:
    (1) a connection string that, when executed, identifies a location of the first data storage that the data entity is stored in, and
    (2) a data adapter that, when executed, indicates functionality for accessing the first data type used to store the data entity;
  replicating the directory to a replicated directory for access by a set of client applications;
  receiving an indication of a modification to the data entity;
  in the event that the modification to the data entity includes a relocation of the data entity from the first data storage to a second data storage, causing the connection string stored in the directory to be updated such that the updated connection string, when executed, identifies the location of the second data storage to which the data entity has been relocated and causing the replicated directory to be updated with the updated connection string; and
  in the event that the modification to the data entity includes a change in the storage of the data entity from the first data type to a second data type that is different from the first data type, causing the data adapter stored in the directory to be updated such that the updated data adapter, when executed, indicates functionality for accessing the second data type and causing the replicated directory to be updated with the updated data adapter.

20. The method of claim 19 further comprising receiving a request from a client application in the set of client applications to provide the replicated directory with an update of the directory.

* * * * *